(12) United States Patent
Tucker

(10) Patent No.: US 7,494,181 B2
(45) Date of Patent: Feb. 24, 2009

(54) BICYCLE SEAT

(76) Inventor: Samuel Tucker, 110 Kay St., Manhattan, IL (US) 60442

( * ) Notice: Subject to any disclaimer, the term of this patent is extended or adjusted under 35 U.S.C. 154(b) by 145 days.

(21) Appl. No.: 11/469,935

(22) Filed: Sep. 5, 2006

(65) Prior Publication Data

US 2008/0054689 A1    Mar. 6, 2008

(51) Int. Cl.
   *B62J 1/00*    (2006.01)
   *B62J 1/04*    (2006.01)
   *B62J 1/06*    (2006.01)
   *B62J 1/08*    (2006.01)

(52) U.S. Cl. ............. 297/201; 297/215.13; 297/215.14; 297/215.15; 248/298.1

(58) Field of Classification Search ................ 297/201, 297/215.13, 215.14, 215.15; 248/298.1
   See application file for complete search history.

(56) References Cited

U.S. PATENT DOCUMENTS

| | | | | |
|---|---|---|---|---|
| 163,909 | A | * | 6/1875 | Balcom ................... 248/298.1 |
| 572,062 | A | * | 11/1896 | Peck ........................... 297/201 |
| 572,273 | A | * | 12/1896 | Peterson ................ 297/215.14 |
| 616,178 | A | * | 12/1898 | Barron ....................... 297/201 |
| 694,875 | A | * | 3/1902 | Meighan ..................... 297/201 |
| 1,050,235 | A | * | 1/1913 | Scanlan ............... 248/298.1 X |
| 1,050,395 | A | * | 1/1913 | Schleicher ............... 248/298.1 |
| 1,602,261 | A | * | 10/1926 | Hill ........................ 248/298.1 |
| 3,377,084 | A | * | 4/1968 | Musichuk .............. 297/215.14 |
| 3,603,609 | A | * | 9/1971 | Hott et al. ........... 297/215.14 X |
| 3,826,459 | A | * | 7/1974 | Warren ................ 248/298.1 X |
| 4,108,462 | A | * | 8/1978 | Martin ............... 297/215.14 X |
| 4,387,925 | A | | 6/1983 | Barker |
| 4,451,086 | A | * | 5/1984 | Seven ..................... 297/201 X |
| 4,512,608 | A | * | 4/1985 | Erani ......................... 297/201 |
| 4,541,668 | A | | 9/1985 | Rouw |
| 4,711,538 | A | * | 12/1987 | Ohs et al. ............. 248/298.1 X |
| 4,730,913 | A | * | 3/1988 | Boothe ................ 248/298.1 X |
| 4,753,410 | A | * | 6/1988 | Dyer .................... 248/298.1 X |
| 4,772,069 | A | * | 9/1988 | Szymski ................ 297/215.14 |

(Continued)

FOREIGN PATENT DOCUMENTS

GB    2121740 A  *  1/1984  .................. 297/201

(Continued)

OTHER PUBLICATIONS

John M. Martinez, MD, Bicycle Seat Neuropathy, eMedicine, Oct. 21, 2004.

(Continued)

*Primary Examiner*—Rodney B. White
(74) *Attorney, Agent, or Firm*—Michael P. Mazza

(57) ABSTRACT

An apparatus and method for supporting the rider of a pedaled device, such as a bicycle. One preferred apparatus includes first and second seat portions independently pivotable about a generally horizontal axis normal to a frame plane of the bicycle to allow, during bike pedaling, substantially unimpeded downward movement of the rear of the rider's upper-thighs, while the rider's buttocks remain free to contact the seat portions. The seat portions are preferably configured to jointly support the rider and to provide a gap for the rider's groin. The seat portions are preferably secured to the bicycle frame in a manner that allows adjustable lateral rotation in relation to the bicycle frame, further facilitating the rider's freedom of movement during pedaling.

6 Claims, 9 Drawing Sheets

U.S. PATENT DOCUMENTS

| | | | |
|---|---|---|---|
| 4,877,286 A | | 10/1989 | Hobson et al. |
| 5,149,034 A | * | 9/1992 | Ganaja ................ 297/215.14 X |
| 5,352,016 A | | 10/1994 | Hobson |
| 5,364,160 A | * | 11/1994 | Fritschen et al. .... 297/215.14 X |
| 5,387,025 A | | 2/1995 | Denisar |
| 5,441,327 A | * | 8/1995 | Sanderson .......... 297/215.15 X |
| 5,513,895 A | * | 5/1996 | Olson et al. ............ 297/215.14 |
| 5,709,430 A | * | 1/1998 | Peters ......................... 297/201 |
| 5,911,474 A | | 6/1999 | Lee |
| 5,921,624 A | * | 7/1999 | Wu ....................... 297/215.14 |
| 6,056,356 A | * | 5/2000 | Unger, Jr. .................... 297/201 |
| 6,357,825 B1 | * | 3/2002 | Bavaresco ................... 297/201 |
| 6,402,235 B1 | | 6/2002 | Letendre |
| 6,752,453 B1 | * | 6/2004 | Yapp ..................... 297/215.14 |
| 6,761,400 B2 | | 7/2004 | Hobson |
| 6,786,542 B1 | * | 9/2004 | Nuzzarello ................... 297/201 |
| 6,827,397 B1 | * | 12/2004 | Driver ................... 297/215.14 |
| 7,104,600 B2 | * | 9/2006 | Scholz ........................ 297/201 |
| 7,249,800 B2 | * | 7/2007 | Jalkanen ..................... 297/201 |

FOREIGN PATENT DOCUMENTS

WO  WO 9403357 A1 *  2/1994

OTHER PUBLICATIONS

Bicycle Anatomy, http://members.cruizio.com, Dec. 3, 2002.
Joshua Cohem PT, MS., Finding the Perfect Bicycle Seat, http://www.roadbiker.com/pbs_page.htm.
Thomas F. Boyd, R.R. Neptune, and M.L. Hull, Pedal and Knee Loads Using a Multi-Degree-of-Freedom Pedal Platform in Cycling, Elsevier, Sep. 30, 1996.
Tesco Shopping, http://www.tesco-shopping.com/bikeseat FAQ. htm.
BikeMania.Biz, Hobson Bicycle Seat, http://www.Bikemania.biz/Hobson_Bike_Seat_p/hobsonseat.htm.
Tara Parker-Pope, Score One for the Couch Potatoes: New Studies Link Bicycling to Impotence, Health Journal, Oct. 15, 2002—vol. CCXL No. 75.
Hobson Products, Easyseat, http://www.hobsonseats.com/prod_easy.htm.
Hobson Products, Easyseat II, http://www.hobsonseats.com/prod_easyii.htm.

* cited by examiner

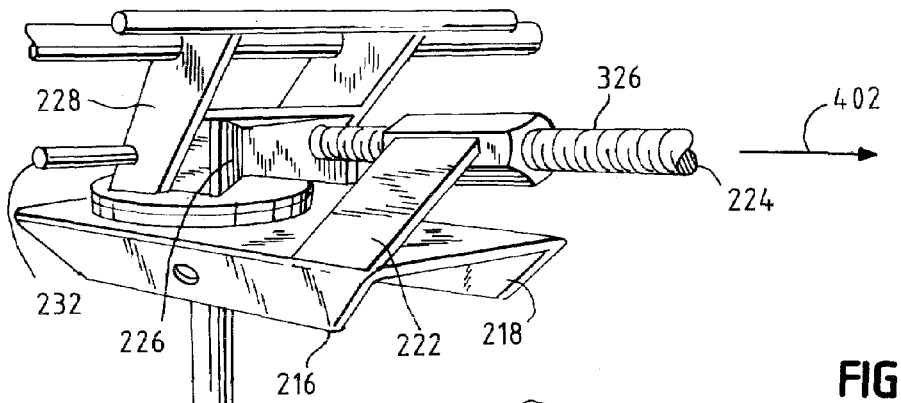
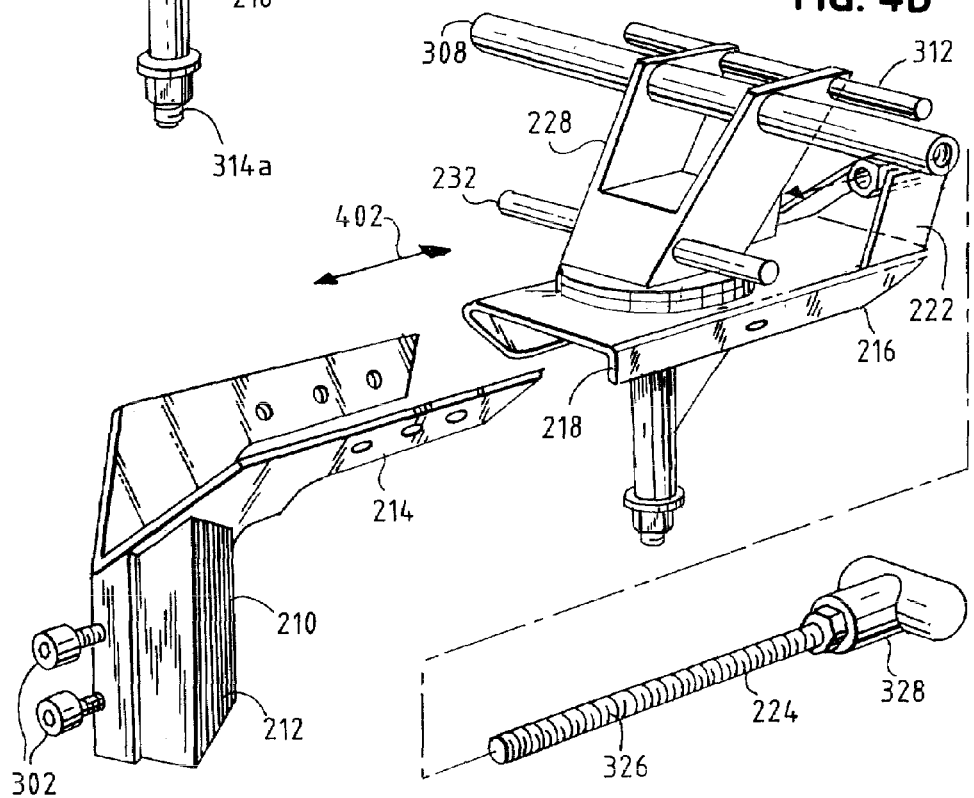

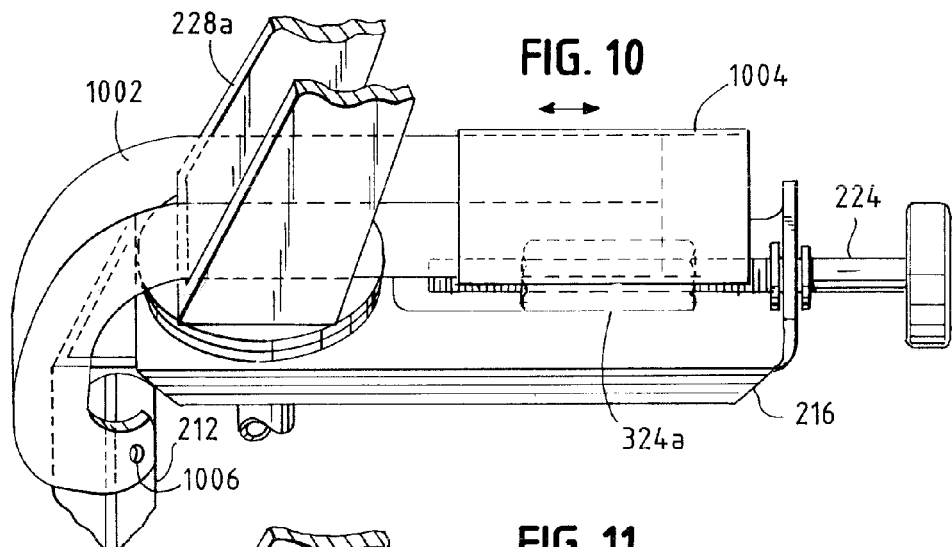
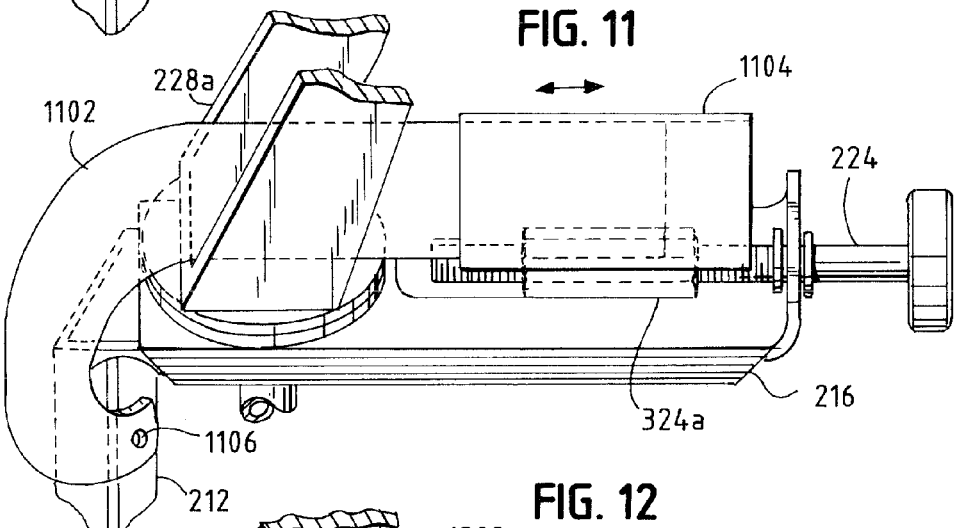
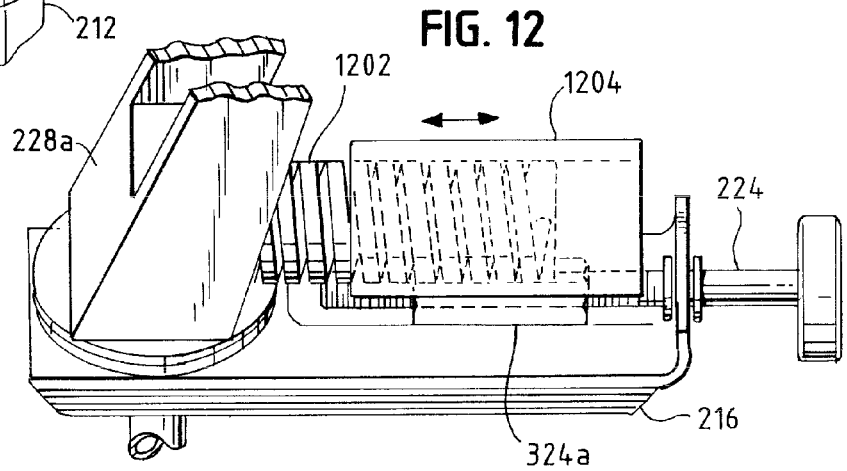

BICYCLE SEAT

BACKGROUND OF THE INVENTION

The present invention relates generally to body supports for pedaled devices, such as a seat for a bicycle. More specifically, the invention relates to a bicycle seat that relieves pressure from the rider's groin area, provides greater support flexibility and adjustment, and offers increased range of movement. The bicycle seat provides improvements over bicycle seats currently available. The improvements are believed to result in a more comfortable and healthier support for the rider, and a more efficient pedal motion.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

The "post axis" is a reference line for defining the range of movement of the body support, or seat. The post axis is parallel to the upper portion of the seat post and passes through the center of the seat post.

The "frame plane" is a reference plane for defining the range of movement of the body support. The frame plane bisects the pedaled device longitudinally such that substantially mirrored images of the frame of the pedaled device lie on each side of the frame plane.

The "pivot axis" is a reference line for defining the rotational movement of the third frame portion 228 and body supports 202, 204 about a generally vertical axis, which is pivot axis 314.

The "support axis" is a reference line for defining the lateral range of motion of seat portions of the body support in relation to the frame plane, and the "support axle" is an axle contiguous with the support axis. The first and second body supports, or seat pads, laterally rotate around the support axis. In the case of the body support shown in FIG. 3, the support axis is the rotational axis for the first support 202 and the second support 204 as illustrated by arrow 302. In FIG. 3, the support axis runs through the center of support axle 314.

SUMMARY OF THE INVENTION

The present invention provides an apparatus and method for supporting the rider of a pedaled device, such as a bicycle. In one preferred apparatus, a first frame portion includes a horizontal stem, a second frame portion includes a sleeve configured to slide along the horizontal stem, a support axle is secured to the second frame portion, and first and second supports for a rider are configured to rotate about the support axle. Another preferred apparatus includes one or more mechanisms for adjustably moving a support for the rider parallel to a frame plane, and for adjustably regulating rotation of the support about a support axis.

In yet another apparatus embodiment, the body support is a bicycle seat with first and second seat portions jointly supporting a rider and shaped to provide a gap for the rider's groin. The seat portions may be configured to each independently pivot, so that one of the seat portions permits substantially unimpeded movement of the rear of a rider's upper-thigh of a first leg while a buttock of a second leg remains free to contact the other of the seat portions. The first and second supports may be capable of at least partially rotating about the support axis, and the location of the support axis may be adjustable.

In still another apparatus embodiment, the pedaled device includes a frame defining a frame plane and a seat post defining a post axis, and the body support includes a first support and a second support. The supports may be configured to pivot to an angle sufficient to allow substantially unimpeded movement of the rear of the rider's upper-thighs, while the rider's buttock remains free to contact a support during the downstroke of the rider's leg. The supports may be configured to jointly support the rider when the rider is not pedaling and may also be configured to provide a gap for the rider's groin. The supports may be capable of at least partially rotating about the support axis, and the location of the support axis may be adjustable.

Additional apparatus embodiments are disclosed in which the support axis is adjustable along the frame plane of the pedaled device. The support axis may be adjusted to be coincident with the post axis, and may be located rearward of the seat post of the pedaled device. The location of the support axis may be adjustable using a stem and a sleeve, as well as possibly also a set screw. The first and second supports may be configured to rotate about the support axis, and the degree of rotation may be adjustable using, as a non-limiting example, a wedge and a stop. The pivoting of the first and second supports may be limited by a pivot stop. The first and second supports may be configured to pivot upon a horizontal axis, and the degree of pivoting may be limited by a pivot stop.

In a preferred method according to the present invention, at least one body support is provided for use by a rider of a bicycle having a frame defining a frame plane. The at least one body support defines a support axis. First, first and second seat portions are provided, and configured to jointly support the bike rider and shaped to provide a gap for the rider's groin area. During pedaling of the bicycle, the seat portions are independently pivoted so that they are rotated in different directions about a support pivot axis normal to the frame plane. This permits substantially unimpeded downward movement of the rear of a rider's upper-thigh of a first leg while a buttock of a second leg is able to remain in contact with a corresponding seat portion. Also during pedaling of the bicycle, the first and second seat portions may be at least partially rotated about the support axis. The pivoting of each seat portion may be limited, such as by a pivot stop. The location of the support axis may also be adjusted in a longitudinal direction along the frame plane.

In an alternative method for using at least one body support for a rider of a pedaled device, the pedaled device includes a frame defining a frame plane, and the at least one body support defines a support axis. In this method, the at least one body support is adjustably moved parallel to the frame plane, and its rotation about the support axis is both permitted and adjustably regulated. The bicycle may include a seat post, and the at least one body support may be moved rearward of the seat post and/or center-biased. In an alternative method embodiment, the at least one body support may be pivoted about a horizontal axis normal to the frame plane.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 4A is a rear perspective view of the second and third frame portions showing the wedge and a portion of the rotational adjustment screw of FIG. 3;

FIG. 4B is a perspective view of the frame portions showing the assembled second and third frame portions and the rotational adjustment screw of FIG. 3;

FIG. 10 is a top-side view of a fourth alternative lateral adjustment for the seat of FIG. 1;

FIG. 11 is a top-side view of a fifth alternative lateral adjustment for the seat of FIG. 1;

FIG. 12 is a top-side view of a sixth alternative lateral adjustment for the seat of FIG. 1;

The components in the drawings are not necessarily to scale, emphasis instead being placed upon clearly illustrating the principles of the present invention. In the drawings, like reference numerals designate corresponding parts throughout the several views.

DETAILED DESCRIPTION OF PREFERRED EMBODIMENTS

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

Figure 1:
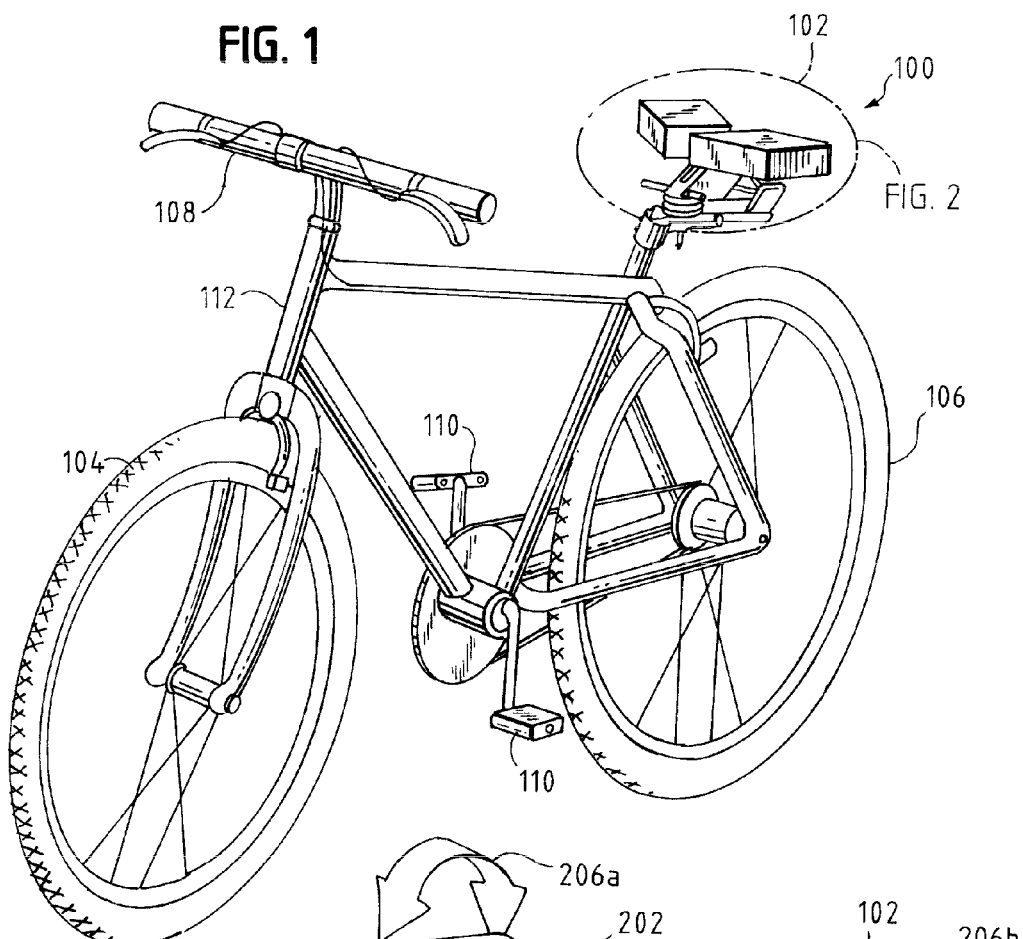
FIG. 1 is a perspective view of a bicycle having a seat of the present invention.

Referring first to FIG. 1, a pedaled device such as a bicycle 100 has a body support or seat 102 according to a preferred embodiment of the present invention. The pedaled device may be a bicycle, a unicycle, an exercise bike, a stationary bike, or any other type of pedaled device known to those having ordinary skill in the art.

In the preferred embodiment, bicycle 100 includes first wheel 104, second wheel 106, handlebar 108, pedals 110, and frame 112. The frame is supported by wheels 104 and 106. Frame 112 supports handlebar 108, pedals 110, and seat 102. Seat 102 is secured to frame 112 through seat post 114. Seat post 114 defines a post axis as described below. A frame plane is defined by frame 112 of bicycle 100 as described below.

The "post axis" is a reference line for defining the range of movement of the body support, or seat. The post axis is parallel to the upper portion of the seat post and passes through the center of the seat post. In the case of a common straight tubular seat post, such as seat post 114, having an open circular upper end portion, the "post axis" is a line that is parallel to the seat post and that passes through the center of the open circular upper end.

The "frame plane" is a reference plane for defining the range of movement of the body support. The frame plane bisects the pedaled device longitudinally such that substantially mirrored images of the frame of the pedaled device lie on each side of the frame plane. In the case of the two wheeled pedaled device shown in FIG. 1, the reference frame plane bisects the frame 112 and the rear second wheel 106; and the reference frame plane also bisects the front first wheel 104 when the front wheel 104 is not turned in either direction.

Figure 2:
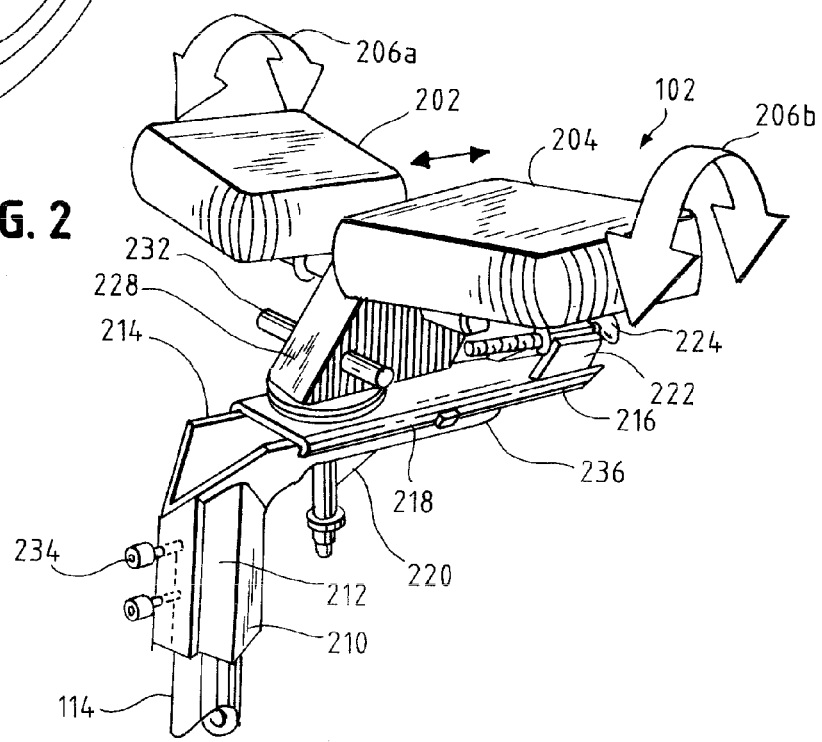
FIG. 2 is an enlarged perspective view of the seat of FIG. 1.

FIG. 2 is an enlarged perspective view of a preferred embodiment of seat 102. Seat 102 includes first support 202 and second support 204. Supports 202, 204 may be cushioned pads covered with a ¾" gel pad. Supports 202 and 204 may be of a variety of designs, such as but not limited to, those shown in U.S. Pat. No. 6,761,400 to Hobson; U.S. Pat. No. 6,402,235 to Letendre; U.S. Pat. No. 5,911,474 to Lee; U.S. Pat. No. 5,387,025 to Denisar; U.S. Pat. No. 5,352,016 to Hobson; U.S. Pat. No. 4,877,286 to Hobson et al.; U.S. Pat. No. 4,541,668 to Rouw; and U.S. Pat. No. 4,387,925 to Barker, each of which is entirely incorporated herein by reference.

Figure 5:
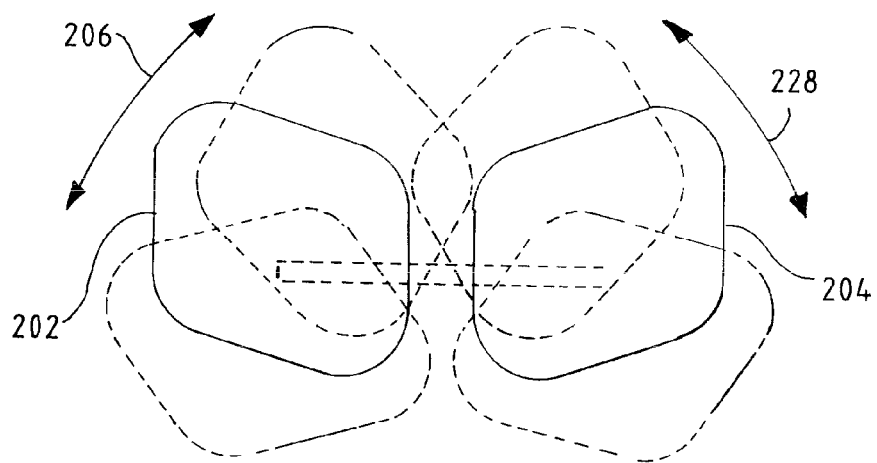
FIG. 5 is a demonstrative front view illustrating an exemplar range of movement of the seat of FIGS. 1 and 2.

Jumping ahead to FIG. 5 to provide an illustration of the range of flexibility offered by seat 102 prior to further examination of seat components, first support 202 is preferably configured to pivot, in a manner roughly demonstrated by arrow 206, to an angle sufficient to allow substantially unimpeded movement of the rider's right upper-thigh, while the rider's right buttock remains free to contact first support 202 during the rider's pedaling downstroke with his right leg.

Second support 204 is preferably configured to pivot, in a manner roughly demonstrated by arrow 208, to an angle sufficient to allow substantially unimpeded movement of the rider's left upper-thigh while the rider's left buttock remains free to contact second support 204 during the rider's downstroke with his left leg. Support 202, 204 are configured to jointly support the rider. For example, the rider's weight may be distributed between the two supports when the rider is not pedaling.

The range of motion shown by arrows 206 and 208 includes a pivoting motion shown in FIG. 2 by arrows 206a and 208b. Continuing to view FIG. 2 while also looking at FIGS. 3, 4A and 4B, seat 102 may also include a frame consisting of three cooperating parts. This frame may include first frame portion 210 which may be secured to seat post 114. First frame portion 210 may include a seat post collar 212 and a horizontal stem 214. The frame may include a second frame portion 216 that includes a sleeve 218, a lower component 220, and an upper component 222. The sleeve 218 may be configured to adjustably slide along horizontal stem 214 of first frame portion 210.

Upper component 222 may by configured to support and allow passage of rotational adjustment screw 224. Rotational adjustment screw 224 may be, but is not limited to, a $^{3}/_{18}$ inch diameter threaded shaft with 16-24 threads per inch. Rotational adjustment screw 224 may seat in a wedge 226 (best seen in FIG. 4A) formed in third frame portion 228 such that rotation of a third frame portion 228 is prevented when a stop, such as the rotational adjustment screw 224 shown, is fully tightened. In alternative embodiments, wedge 226 may be a replaceable insert made of materials such as but not limited to plastic and rubber. Loosening the rotational adjustment screw 224 allows adjustable rotational movement of the third frame portion 228 such as shown by arrow 302 in FIG. 3.

Third frame portion 228 may rotatably secure first support 202 and second support 204 to second frame portion 216. Third frame portion 228 may include lower pivot stops 232 to prevent over-pivoting of first support 202 and second support 204. Among other designs that will be obvious to those having ordinary skill in the art, the lower pivot stops 232 may be a .3125 inch steel or titanium bar. The lower pivot stops 232 may be incorporated into third frame portion 228, or, alternatively, fixed to third frame portion 228 in any conventional manner.

Seat post collar 212 of first frame portion 210 is shown, and may consist of a square metal frame. Among other designs, seat post collar 212 may be formed from 1-inch by 1-inch square steel or titanium tubing, or may be of other designs that will be obvious to those having ordinary skill in the art. Seat post collar 212 may be secured to seat post 114 using one or more set screws 234. Set screws 234 may mate in holes or indentations (not shown) formed in second frame portion 216.

Figure 3:
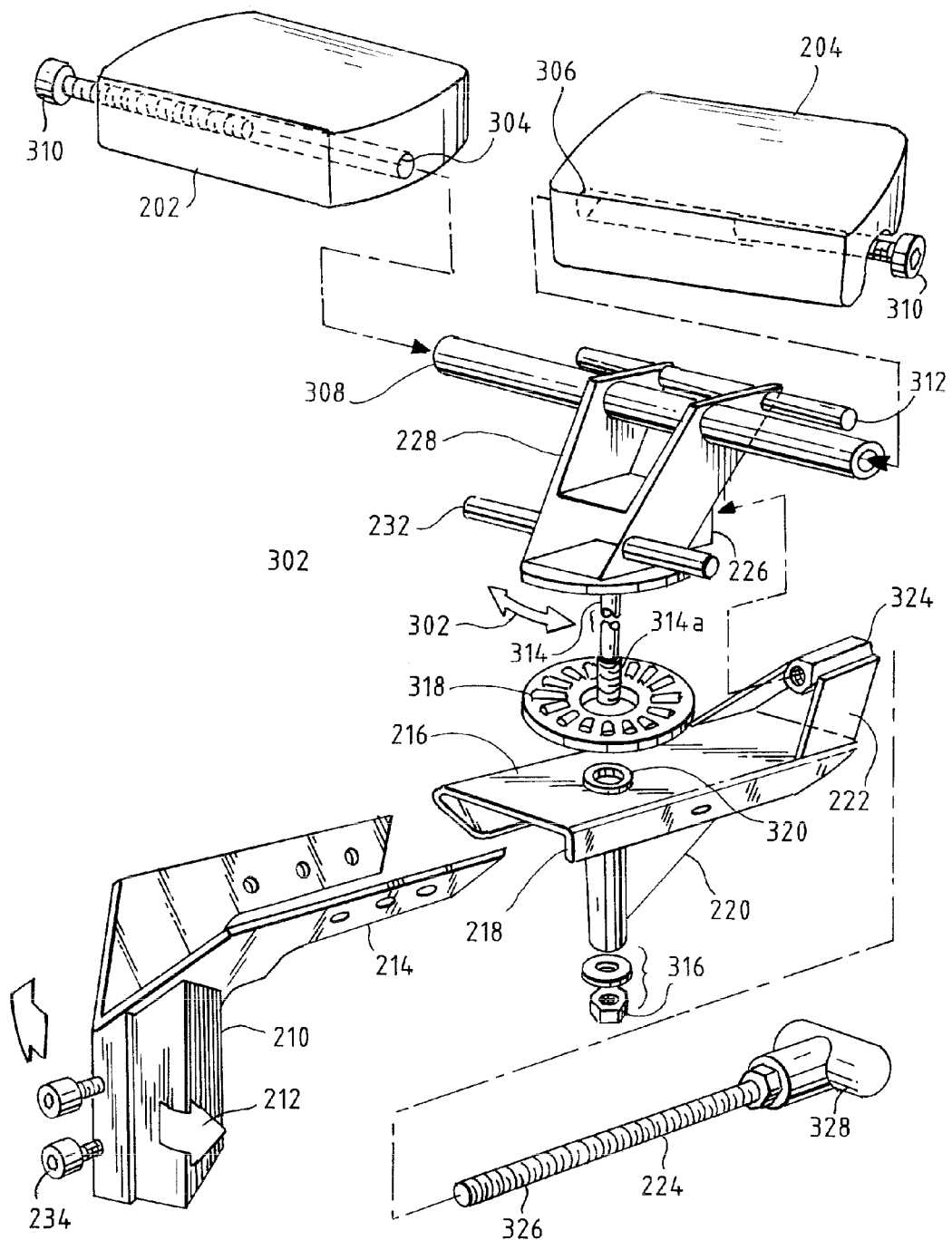
FIG. 3 is a perspective, exploded view of the seat of FIGS. 1 and 2 including first and second frame portions showing a lateral rotational adjustment screw, and a wedge incorporated into the third frame portion.

Referring to FIG. 3, first support 202 and second support 204 may include fastener engagements 304 and 306 with apertures (e.g., ½-inch diameter apertures) that permit first support 202 and second support 204 to be attached to horizontal pivot axle shaft 308. Horizontal pivot axle shaft 308 may consist of a variety of shafts, such as but not limited to a $^{5}/_{16}$-inch diameter steel shaft or a ½ inch titanium shaft. First support 202 and second support 204 may be secured to horizontal pivot axle shaft 308 using fasteners 310 (e.g., bolts and washers).

Horizontal pivot axle shaft 308 may be rigidly attached to, or incorporated into, third frame portion 228. In addition to lower pivot stop 232, the exploded view of FIG. 3 shows that third frame portion 228 may also include upper pivot stops 312. Upper pivot stops 312 may consist of 0.3125 inch steel or titanium bars, or other designs that will be obvious to those having ordinary skill in the art. Upper pivot stops 312 prevent over pivoting and support first support 202 and second support 204 during the rider's upstroke, and while the rider is sitting on seat 102.

In an alternative embodiment, axle shaft 308 may have a bearing mounted on its shaft and be mounted in a tube (not shown) incorporated into the third frame portion 228. The first support 202 and second support 204 may then be rigidly mounted on axle shaft 308.

Still referring to FIG. 3, third frame portion 228 may also include support axle 314. Support axle 314 may include a terminal portion 314a. Support axle 314 may be, but is not limited to, a $^{3}/_{8}$ inch steel or titanium shaft, or other designs that will be obvious to those having ordinary skill in the art. Support axle 314 may extend through sleeve 218 and lower component 220 of second frame portion 216 in order to rotatably secure third frame portion 228 to second frame portion 216.

Terminal portion 314a may include threads allowing a fastener 316 (e.g., a nut and washer) to be employed to secure rotatable third frame portion 228 to second frame portion 216. A bearing 318, such as but not limited to a thrust bearing such as Motion Industries #GS81106 BRG, and a complimentary bearing race 320, may also be employed to allow rotation of third frame portion 228.

The "support axis" is a reference line for defining the lateral range of motion of seat portions of the body support in relation to the frame plane. The first and second body supports, or seat pads, laterally rotate around the support axis. In the case of the body support shown in FIG. 3, the support axis is the rotational axis for the first support 202 and the second support 204 as illustrated by arrow 302. In FIG. 3, the support axis runs through the center of support axle 314.

Referring again to FIG. 2, second frame portion 216 may also include fastener 236, such as a set screw, for adjustably securing sleeve 218 of second frame portion 216 to the horizontal stem 214 of first frame portion 210. Adjusting the fastener 236 along horizontal stem 214 allows the support axis to be moved along the horizontal stem 214.

Referring again to FIG. 3, second frame portion 216 may also include a threaded race 324. Threaded race 324 allows passage of the shaft 326 of the rotational adjustment screw 224 when handle 328 is turned.

FIG. 4A illustrates second frame portion 216 and third frame portion 228 showing the wedge 226 and the rotational adjustment screw 224 of FIG. 3. When rotational adjustment screw 224 is advanced toward the wedge 226, the rotational adjustment screw seats in wedge 226 such that rotation of third frame portion 228 is adjustably restricted in relation to second frame portion 216. Withdrawing rotational adjustment screw 224 allows an adjustable rotation of third frame portion 228 in the manner shown by arrow 402 of FIGS. 4A and 4B.

Figure 6:
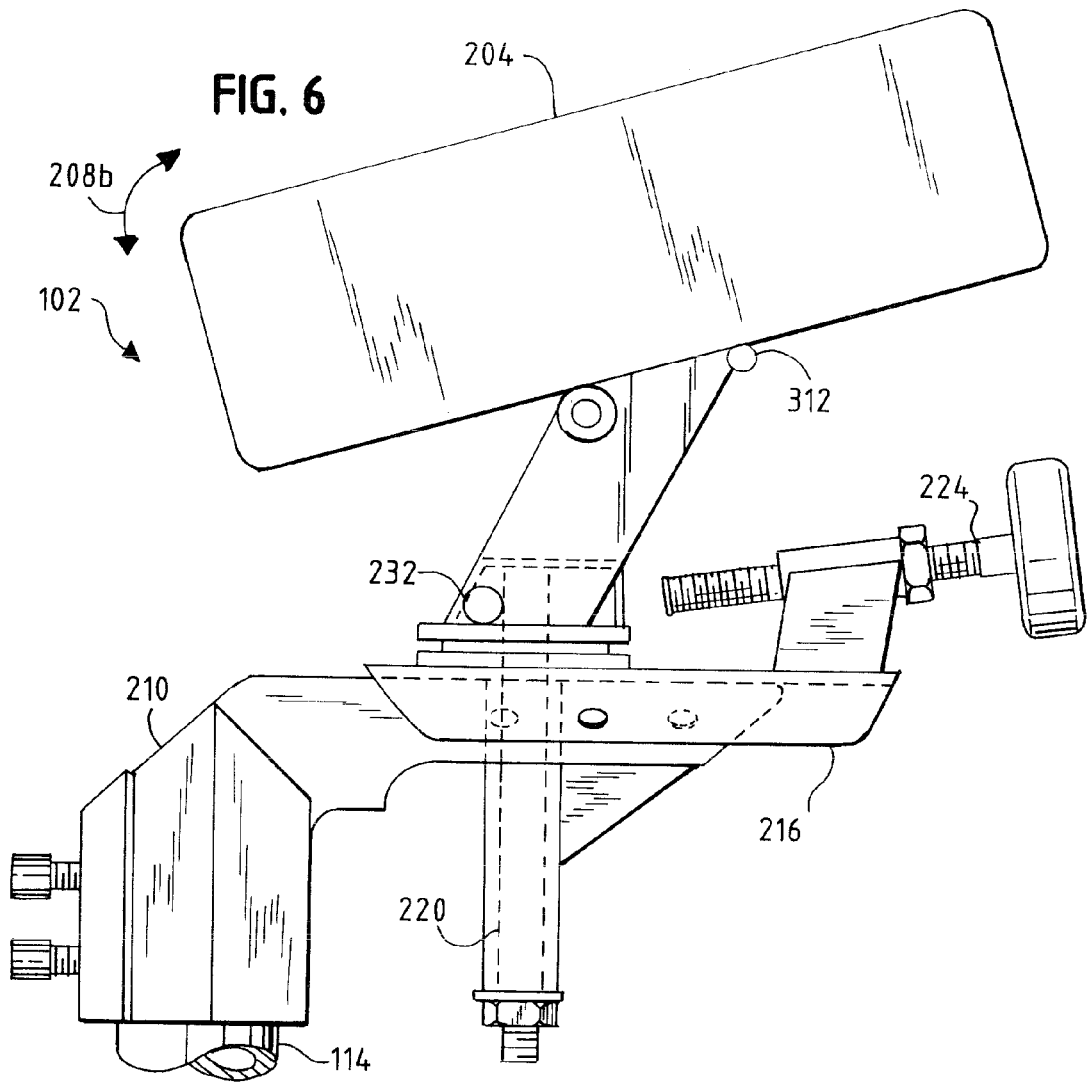
FIG. 6 is a side view of the seat of FIGS. 1 and 2.

FIG. 5 illustrates an exemplary range of movement of the seat 102 shown in FIGS. 1 and 2. As the rider pedals, first support 202 and second support 204 may pivot and rotate in the manner shown by arrows 206 and 208. As shown in FIG. 6, the pivoting of second support 204 may be constrained by upper pivot stop 312 and lower pivot stop 232.

The operation of the seat 102 embodiment as disclosed above will now be described. In one embodiment, the invention provides a seat 102 with first and second seat portions 202 and 204 jointly supporting a rider and shaped to provide a gap for the rider's groin. The seat portions 202 and 204 are configured to each independently pivot, whereby one of the seat portions permits substantially unimpeded movement of the rear of a rider's upper-thigh of a first leg while a buttock of a second leg remains free to contact the other of the seat portions, and the first and second supports are capable of at least partially rotating about the support axis, where the location of the support axis is adjustable.

In another embodiment, the invention provides body support 102 for a rider of pedaled device 100, where pedaled device 100 has a frame 112 and a seat post 114, and the seat post 114 defines a post axis. Body support 102 includes first support 202 configured to pivot to an angle sufficient to allow substantially unimpeded movement of the rear of the rider's right upper-thigh, while the rider's right buttock remains free to contact first support 202 during the downstroke of the rider's right leg. Body support 102 also includes second support 204 configured to pivot to an angle sufficient to allow substantially unimpeded movement of the rear of the rider's left upper-thigh, while the rider's left buttock remains free to contact second support 204 during the downstroke of the rider's left leg. Supports 202 and 204 are configured to jointly support the rider when the rider is not pedaling, and are configured to provide a gap for the rider's groin. Further, supports 202 and 204 are secured to frame 112 such that supports 202 and 204 are capable of at least partially rotating about the support axis, where the location of the support axis is adjustable.

In another embodiment, the support axis is adjustable along the frame plane of pedaled device 100. In another embodiment, the support axis may be adjusted to be coincident with the post axis. In another embodiment, the support axis is located further to the rear of pedaled device 100 than seat post 114. In another embodiment, the location of the support axis is adjustable using stem 214 and sleeve 218. In another embodiment, the support axis is adjustable using stem 214, sleeve 218, and a set screw, such as fastener 236. In another embodiment, supports 202 and 204 are configured to rotate about the support axis, and the degree of rotation is adjustable. In another embodiment, the degree of rotation is adjustable with wedge 226 and stop 224. In another embodiment, the pivoting of supports 202 and 204 is limited by pivot stop 232 and/or 312. In a further embodiment, supports 202 and 204 pivot upon a horizontal axis and the degree of pivoting is limited by pivot stop 232 and/or 312.

FIGS. 7-21 show alternative embodiments for allowing the rotational movement of the third frame portion 228 such as shown by arrow 302 in FIG. 3. FIGS. 7-21 show second frame portion 216 and third frame portion 228. FIGS. 7-13 and 15-21 show the rotational adjustment screw 224 that was previously described and illustrated above. In the embodiments illustrated in FIGS. 7-13 and 15-21, loosening the rotational adjustment screw 224 allows adjustable rotational movement of the third frame portion 228 such as shown by arrow 302 in FIG. 3.

Figure 7:
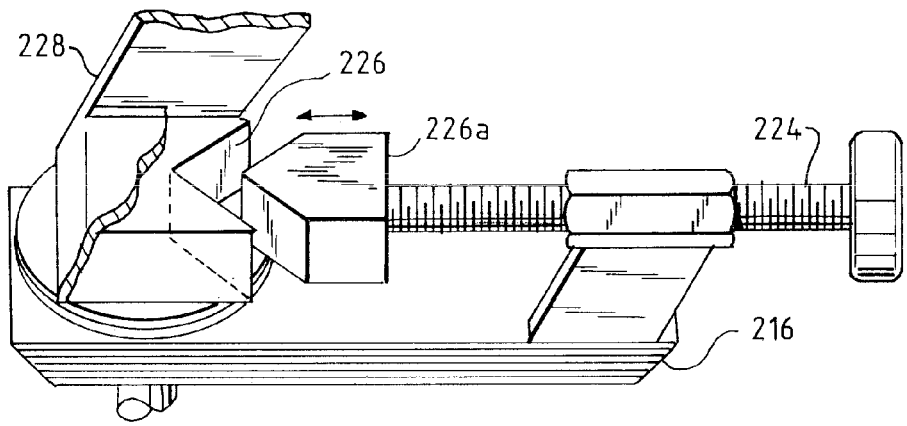
FIG. 7 is a top-side view of a first alternative lateral adjustment for the seat of FIG. 1.

FIG. 7 is a top-side view of a first alternative lateral adjustment for the seat 102 of FIG. 1. The first alternative embodiment of the lateral adjustment includes the previously described wedge 226 and a mating wedge 226a. The mating wedge 226a is secured to rotational adjustment screw 224. Mating wedge 226a may seat in wedge 226 such that rotation of a third frame portion 228 is prevented when the rotational adjustment screw 224 is fully tightened.

Figure 8:
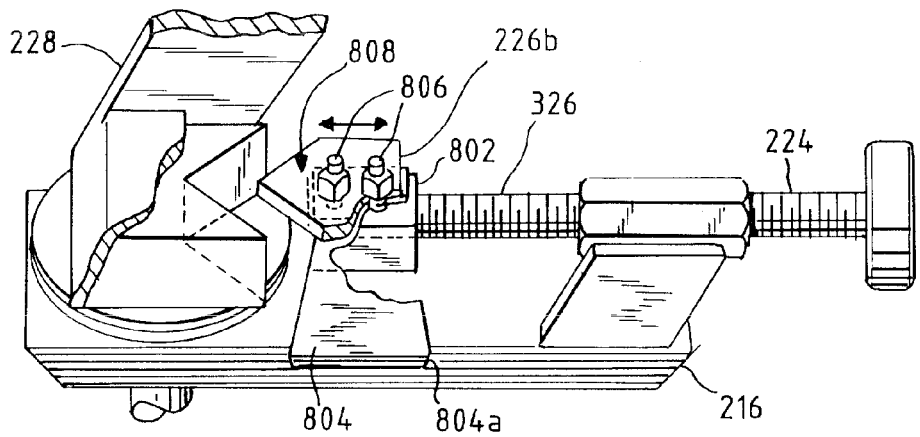
FIG. 8 is a top-side view of a second alternative lateral adjustment for the seat of FIG. 1.

FIG. 8 is a top-side view of a second alternative lateral adjustment for the seat 102 of FIG. 1. The second alternative embodiment of the lateral adjustment includes the previously described wedge 226 and a mounting block 802, a sliding guide 804, securing fasteners 806, wedge 226b, and a wedge plate 808. The mounting block 802 may be internally threaded to allow a secure fit on the shaft 326 of the rotational adjustment screw 224. Fasteners 806, such as but not limited to threaded bolts and mating nuts, may be used to secure mounting block 802, wedge 226b, and wedge plate 808 to shaft 326. The sliding guide 804 may have edges 804a, only one of which is shown in FIG. 8, that fit over the edges of second frame portion 216. Wedge 226b may be formed from materials such as, but not limited to rubber, plastic, and metal. Wedge plate 808 may be used to add additional support to sedge 226b and to provide a secure surface for seating fasteners 806.

Figure 9:
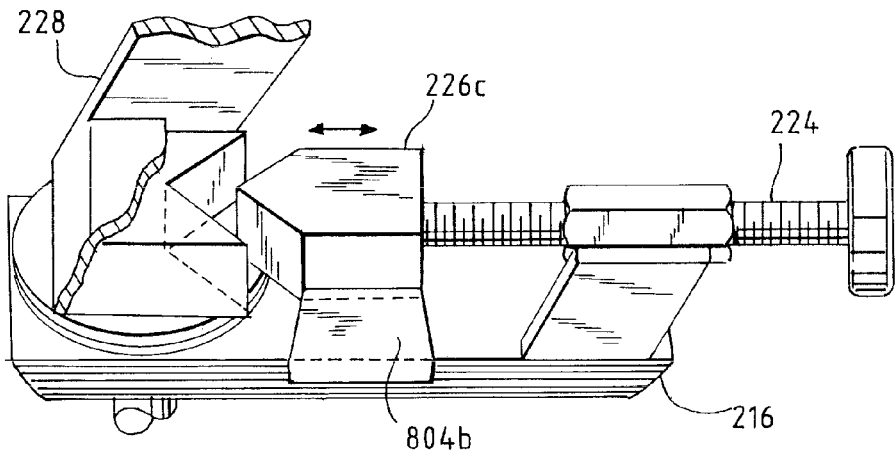
FIG. 9 is a top-side view of a third alternative lateral adjustment for the seat of FIG. 1.

FIG. 9 is a top-side view of a third alternative lateral adjustment for the seat 102 of FIG. 1. The third alternative embodiment of the lateral adjustment includes a mating wedge 226c and a sliding guide 804b. The sliding guide 804b may be secured to the mating wedge 226c. Alternatively, the sliding guide 804b and the mating wedge 226c may be integrally formed from materials such as but not limited to plastic, rubber and metal.

FIG. 10 is a top-side view of a fourth alternative lateral adjustment for the seat 102 of FIG. 1. The fourth alternative embodiment of the lateral adjustment includes a square restrictor 1002 and square sleeve 1004. The square restrictor 1002 may be formed from materials such as rubber and may be 1¼ inches on each side and formed of solid rubber. The square restrictor 1002 may be secured to the seat post collar 212 by means that include a fastener 1006, such as a screw. The square restrictor 1002 may be pliable enough to pass through third frame portion 228a where it is enclosed by sleeve 1004. In another embodiment, square restrictor 1002 may be formed to bend in order to pass through third frame portion 228a. Sleeve 1004 may be mounted on rotational adjustment screw 224. Advancing screw 224 with sleeve 1004 restricts the movement of square restrictor 1002 and thus the lateral movement of third frame portion 228a. Backing screw 224 out of threaded race 324a permits greater lateral movement of square restrictor 1002 and thus greater lateral movement of third frame portion 228a.

FIG. 11 is a top-side view of a fifth alternative lateral adjustment for the seat 102 of FIG. 1. The fifth alternative embodiment of the lateral adjustment includes a circular restrictor 1102 and circular sleeve 1104. The circular restrictor 1102 may be formed from materials such as rubber and may be 1¼ inch round solid rubber. The circular restrictor 1102 may be secured to the seat post collar 212 by means that include a fastener 1106, such as a screw. The circular restrictor 1102 may be pliable enough to pass through third frame portion 228a where it is enclosed by circular sleeve 1104. In another embodiment, circular restrictor 1102 may be formed to bend in order to pass through third frame portion 228a. Sleeve 1104 may be mounted on rotational adjustment screw 224. Advancing screw 224 with sleeve 1104 restricts the movement of circular restrictor 1102 and thus the lateral movement of third frame portion 228a. Backing screw 224 out of threaded race 324a permits greater lateral movement of circular restrictor 1102 and thus greater lateral movement of third frame portion 228a.

FIG. 12 is a top-side view of a sixth alternative lateral adjustment for the seat 102 of FIG. 1. The sixth alternative embodiment of the lateral adjustment includes a spring restrictor 1202 and circular sleeve 1204. The spring restrictor 1202 may be formed from metal or other materials and may be a 1 inch spring. The spring restrictor 1202 may be secured to third frame portion 228. Sleeve 1204 may be mounted on rotational adjustment screw 224. Advancing screw 224 with sleeve 1204 restricts the movement of spring restrictor 1202 and thus the lateral movement of third frame portion 228. Backing screw 224 out of threaded race 324a permits greater lateral movement of third frame portion 228.

Figure 13:
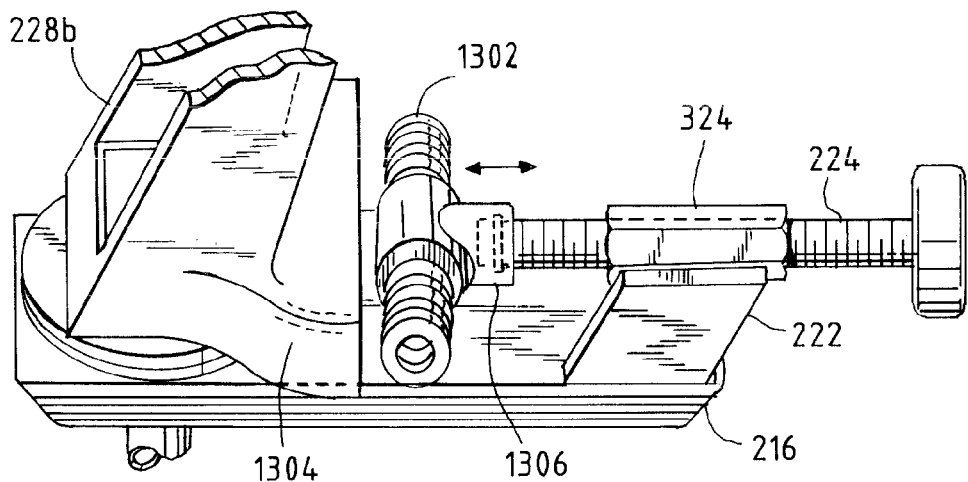
FIG. 13 is a top-side view of a seventh alternative lateral adjustment for the seat of FIG. 1.

FIG. 13 is a top-side view of a seventh alternative lateral adjustment for the seat 102 of FIG. 1. The seventh alternative embodiment of the lateral adjustment includes a cross spring 1302 and cross spring housing 1304 portion of a third frame portion 228b and a cross spring holder 1306 that may be secured to the shaft 324 of screw 224. The cross spring 1302 may be formed from metal or other materials and may be a ½ inch spring. Advancing screw 224 with cross spring 1302 into the cross spring housing 1304 restricts the movement of third frame portion 228b. Cross spring 1302 may also provide a self-centering bias for the seat 102 on the frame plane. Backing screw 224 out of threaded race 324 permits greater lateral movement of third frame portion 228b.

Figure 14:
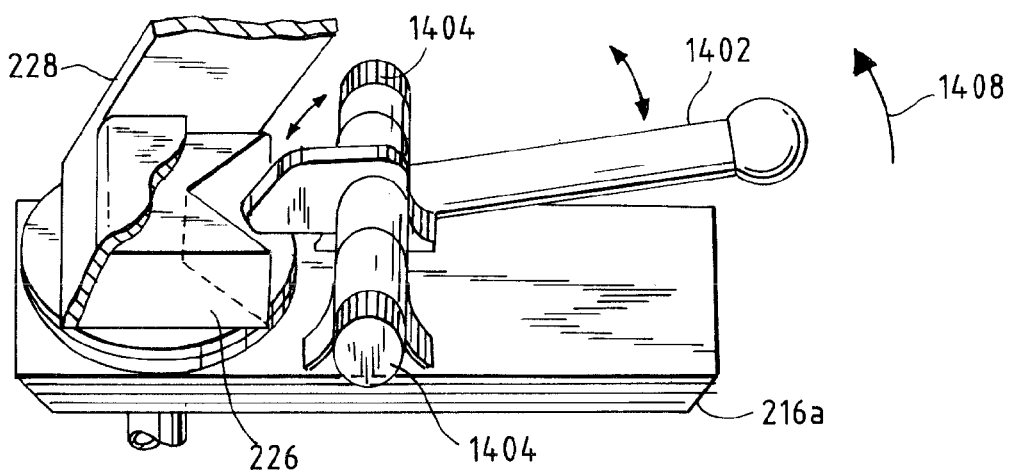
FIG. 14 is a top-side view of an eighth alternative lateral adjustment for the seat of FIG. 1.

FIG. 14 is a top-side view of an eighth alternative lateral adjustment for the seat 102 of FIG. 1. The eighth alternative embodiment of the lateral adjustment includes a lateral adjustment lever 1402 having a restricting paddle end 1402b. The lateral adjustment lever 1402 may be secured to the second frame portion 216a using a lateral clamping knob 1406 with a mating nut 1406a. Pulling lever 1402 vertically, as shown by arrow 1408, causes a greater portion of paddle end 1402b to approach wedge 226 which restricts the movement of third frame portion 228. Pushing lever 1402 in the opposite direction causes paddle end 1402b to pivot about clamping knob 1406 and recede from wedge 226 permitting greater lateral movement of third frame portion 228.

Figure 15:
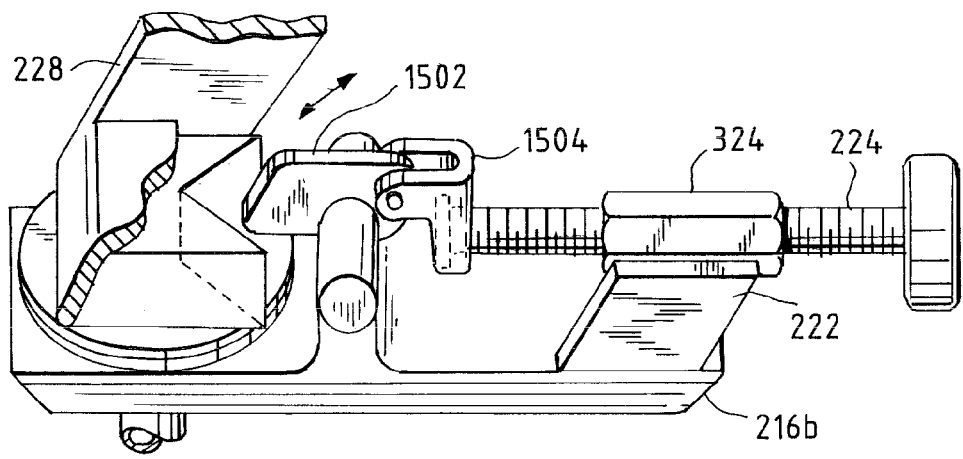
FIG. 15 is a top-side view of a ninth alternative lateral adjustment for the seat of FIG. 1.

FIG. 15 is a top-side view of a ninth alternative lateral adjustment for the seat 102 of FIG. 1. The ninth alternative embodiment of the lateral adjustment includes a rotatable paddle 1502 and a paddle harness 1504. The rotatable paddle 1502 may be rotatably secured to a second frame portion 216b. The paddle harness 1504 may be secured to screw 224 and movably secured to a back portion of the rotatable paddle 1502 such that lateral rotation of a third frame portion 228 is restricted when the rotational adjustment screw 224 is tightened. Loosening the rotational adjustment screw 224 allows adjustable rotational movement of the third frame portion 228 such as shown by arrow 302 in FIG. 3.

Figure 16:
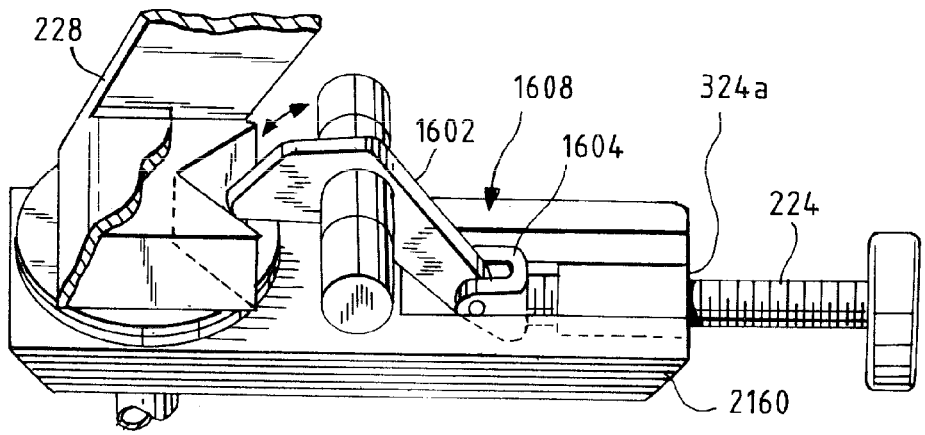
FIG. 16 is a top-side view of a tenth alternative lateral adjustment for the seat of FIG. 1.

FIG. 16 is a top-side view of a tenth alternative lateral adjustment for the seat 102 of FIG. 1. The tenth alternative embodiment of the lateral adjustment includes a rotatable paddle 1602 and a paddle harness 1604. The rotatable paddle 1602 may be rotatably secured to a second frame portion 216c. The paddle harness 1604 may be secured to screw 224 and movably secured to a back portion of the rotatable paddle 1602 such that lateral rotation of a third frame portion 228 is allowed when the rotational adjustment screw 224 is tightened. Loosening the rotational adjustment screw 224 restricts adjustable rotational movement of the third frame portion 228 such as shown by arrow 302 in FIG. 3. In the tenth embodiment, a threaded race 324a portion of the second frame portion 216c is configured, as illustrated, to allow the paddle harness 1604 to engage the paddle 1602 such that the paddle 1602 is raised when the screw 224 is advanced in the race 324a. in the embodiment illustrated, this may be accomplished by placing the harness 1604 below the upper surface 1608 of the second frame portion 216c.

Figure 17:
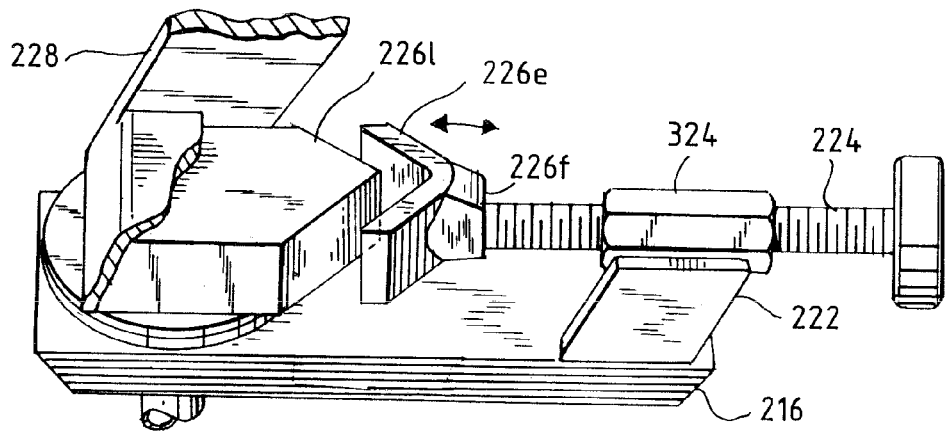
FIG. 17 is a top-side view of an eleventh alternative lateral adjustment for the seat of FIG. 1.

FIG. 17 is a top-side view of an eleventh alternative lateral adjustment for the seat 102 of FIG. 1. The eleventh alternative embodiment of the lateral adjustment includes the protruding wedge 226d and a mating wedge 226e. The mating wedge 226e is secured to rotational adjustment screw 224. Mating wedge 226e may seat in wedge 226 such that rotation of a third frame portion 228 is prevented when the rotational adjustment screw 224 is fully tightened. Mating wedge 226e may be formed from a number of materials such as but not limited to steel and secured to screw 224 in a number of manners such as but not limited to an integrally formed threaded mounting portion 226f.

Figure 18:
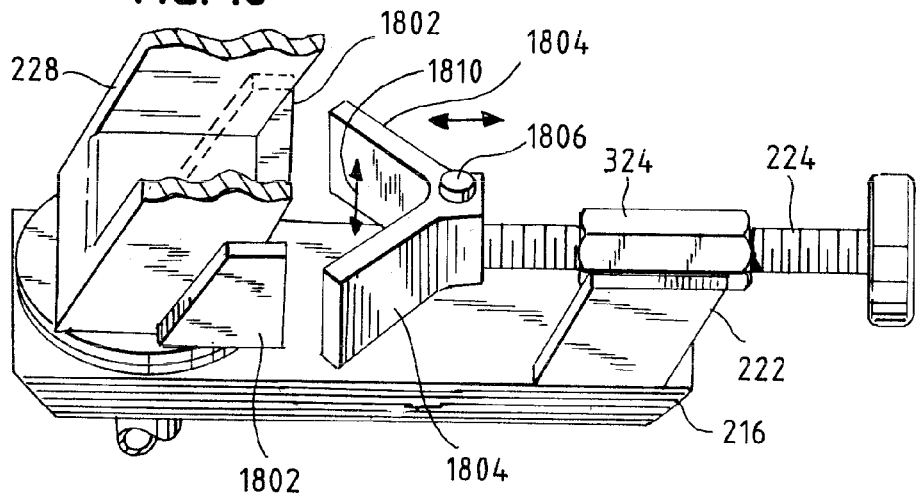
FIG. 18 is a top-side view of a twelfth alternative lateral adjustment for the seat of FIG. 1.

FIG. 18 is a top-side view of a twelfth alternative lateral adjustment for the seat 102 of FIG. 1. The twelfth alternative embodiment of the lateral adjustment includes panels 1802, a restricting panels 1804, and width adjustment mechanism 1806. The panels 1802 are rigidly secured to the third frame portion 228 and may be formed of materials such as but not limited to steel and other metals. The restricting panels are mounted on screw 224 such that adjustment mechanism 1806 allows the area between the panels 1802 to be adjusted, as illustrated by arrow 1810, by turning the adjustment mechanism 1806. Advancing screw 224 causes restricting panels 1804 to advance towards panels 1802 and rotation of third frame portion 228 is prevented when the rotational adjustment screw 224 is fully tightened.

Figure 19:
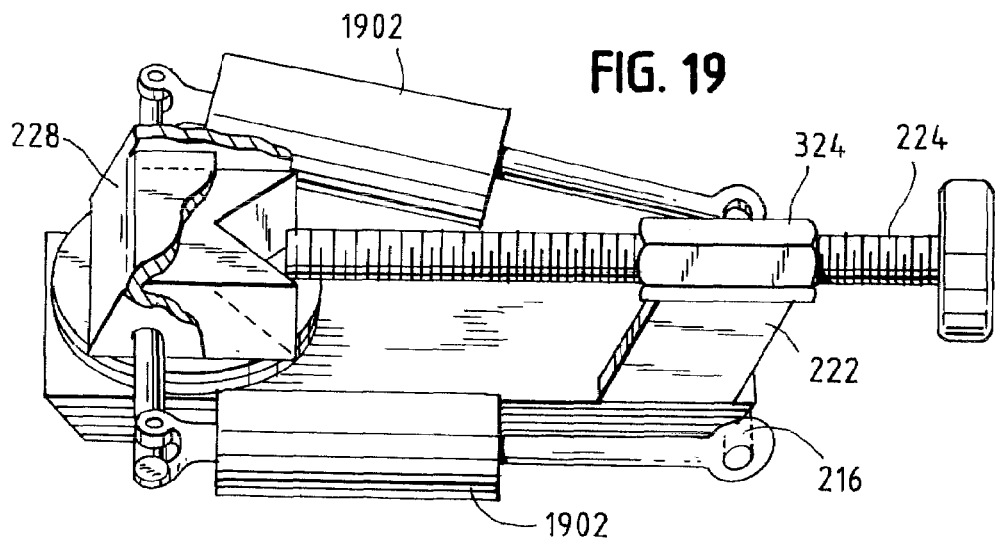
FIG. 19 is a top-side view of a thirteenth alternative lateral adjustment for the seat of FIG. 1.

FIG. 19 is a top-side view of a thirteenth alternative lateral adjustment for the seat 102 of FIG. 1. The thirteenth alternative embodiment of the lateral adjustment provides restrictors, such as but not limited to shock absorbing restrictors 1902, that engage the third frame portion 228 and limit the speed of the lateral rotation of third frame portion 228.

Figure 20:
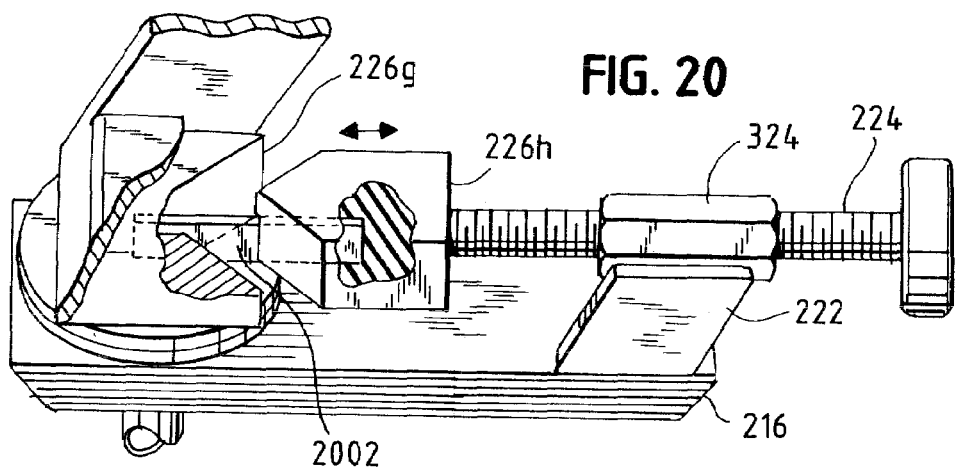
FIG. 20 is a top-side view of a fourteenth alternative lateral adjustment for the seat of FIG. 1.

FIG. 20 is a top-side view of a fourteenth alternative lateral adjustment for the seat 102 of FIG. 1. The fourteenth alternative embodiment of the lateral adjustment includes a wedge 226g, a mating wedge 226h, and a centering strap 2002. The mating wedge 226h is secured to rotational adjustment screw 224. Mating wedge 226h may seat in wedge 226g such that rotation of a third frame portion 228 is prevented when the rotational adjustment screw 224 is fully tightened. The centering strap 2002 is embedded in the mating wedge 226h on one end, and flexibly attached to the third frame portion 228, and/or the wedge 226g, on the other end. The centering strap 2002 may be attached using a number of methods, such as but not limited to using springs to attach strap 2002 to third frame portion 228 and imbedding strap in wedge 226g. Advancing screw 224 with mating wedge 226h towards wedge 226g restricts the movement of third frame portion 228. Strap 2002 provides a self-centering bias for the seat 102 on the frame plane. Backing screw 224 out of threaded race 324 permits greater lateral movement of third frame portion 228.

Figure 21:
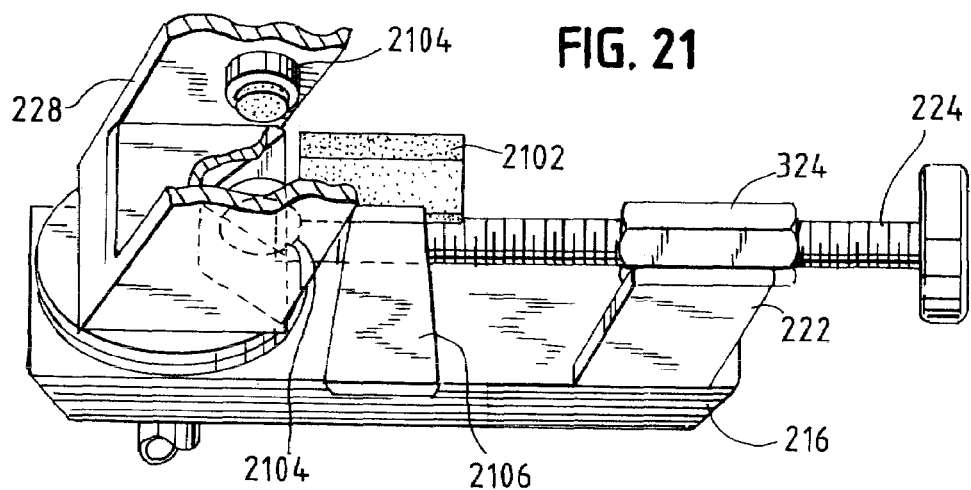
FIG. 21 is a top-side view of a fifteenth alternative lateral adjustment for the seat of FIG. 1.

FIG. 21 is a top-side view of a fifteenth alternative lateral adjustment for the seat 102 of FIG. 1. The fifteenth alternative embodiment of the lateral adjustment includes a centering magnet 2102 and countering magnets 2104. The centering magnet 2102 may be mounted on second frame portion 216 with brackets 2106. The countering magnets 2104 may be mounted on third frame portion 228. The magnets 2102 and 2104 provide some opposition to lateral rotation of third frame portion 228 and provide a self-centering bias for seat 102.

Several benefits of the present invention should now be apparent to those of ordinary skill in the art. Those benefits include a seat 102 that allows the rider freedom of movement in a natural manner that leads to a more efficient, more comfortable, and safer operation of the pedaled device 100.

The terms used in the claims of the patent as filed are intended to have their broadest meaning consistent with the requirements of law. Where alternative meanings are possible, the broadest meaning is intended. All words used in the claims are intended to be used in the normal, customary usage of grammar and the English language.

The above description is not intended to limit the meaning of the words used in the following claims that define the invention. For example, while several possible designs have been described above, persons of ordinary skill in the art will understand that a variety of other designs still falling within the scope of the following claims may be envisioned and used. It is contemplated that these or other future modifications in structure, function or result will exist that are not substantial changes and that all such insubstantial changes in what is claimed are intended to be covered by the claims.

I claim:

1. A bicycle seat comprising:
   a first frame portion having a horizontal stem;
   a second frame portion having a sleeve, the sleeve configured to slide along the horizontal stem;
   a support axle secured to the second frame portion;
   first and second supports for a rider, wherein the first and second supports are configured to rotate about a support axis; and
   a plurality of magnets configured to provide a center bias for the first and second supports.

2. The bicycle seat of claim 1, wherein the first frame portion further comprises a post collar configured to be secured to the frame of the pedaled device, and further comprising a third frame portion rotating about a pivot axis, the third frame portion being rotatably secured to the second frame portion; and
   wherein the first and second supports comprise body supports which are pivotally secured to the pivot axis.

3. The body support of claim 2, further including means for adjusting the rotation of the third frame portion, and for preventing rotation of the third frame portion.

4. The body support of claim 2, wherein the second frame portion includes a screw and the third frame portion includes a wedge, and wherein the screw and the wedge cooperate to allow adjustable rotation of the third frame portion.

5. The body support of claim 2, wherein the second frame portion includes one or more of the following: a wedge and a mating wedge; a sliding guide; a paddle; a piston; or means for center biasing the third frame portion.

6. The body support of claim 2, wherein the third frame portion includes one or more of the following: a lower pivot stop; or an upper pivot stop.

* * * * *